United States Patent
Shah et al.

(10) Patent No.: US 10,691,455 B2
(45) Date of Patent: Jun. 23, 2020

(54) POWER SAVING BRANCH MODES IN HARDWARE

(71) Applicant: Samsung Electronics Co., Ltd., Gyeonggi-do (KR)

(72) Inventors: Tejash M. Shah, Austin, TX (US); Srinivasan S. Iyer, Austin, TX (US); David C. Tannenbaum, Austin, TX (US)

(73) Assignee: Samsung Electronics Co., Ltd (KR)

( * ) Notice: Subject to any disclaimer, the term of this patent is extended or adjusted under 35 U.S.C. 154(b) by 146 days.

(21) Appl. No.: 15/684,573

(22) Filed: Aug. 23, 2017

(65) Prior Publication Data

US 2018/0341489 A1    Nov. 29, 2018

Related U.S. Application Data

(60) Provisional application No. 62/509,885, filed on May 23, 2017.

(51) Int. Cl.
| | | |
|---|---|---|
| G06F 9/30 | (2018.01) |
| G06F 9/38 | (2018.01) |
| G06F 1/3234 | (2019.01) |
| G06F 9/32 | (2018.01) |
| G06T 1/20 | (2006.01) |
| G06F 30/34 | (2020.01) |

(Continued)

(52) U.S. Cl.
CPC ........ *G06F 9/30061* (2013.01); *G06F 1/3243* (2013.01); *G06F 9/30014* (2013.01); *G06F 9/30018* (2013.01); *G06F 9/30058* (2013.01); *G06F 9/322* (2013.01); *G06F 9/3851* (2013.01); *G06F 30/34* (2020.01); *G06T 1/20* (2013.01); *G05B 19/4097* (2013.01); *G05B 2219/45031* (2013.01); *G06F 30/327* (2020.01); *G06F 2119/06* (2020.01)

(58) Field of Classification Search
CPC .................................................... G06F 9/3851
See application file for complete search history.

(56) References Cited

U.S. PATENT DOCUMENTS

| | | | | |
|---|---|---|---|---|
| 6,230,261 B1 * | 5/2001 | Henry | .................. | G06F 9/3846 712/1 |
| 6,430,676 B1 * | 8/2002 | Koblenz | ............... | G06F 8/4451 712/207 |

(Continued)

OTHER PUBLICATIONS

Russ Joseph and Margaret Martonosi, "Run-time Power Estimation in High-Performance Microprocessors", Dept. of Electrical Engineering, Princeton University.

(Continued)

*Primary Examiner* — Michael J Metzger
(74) *Attorney, Agent, or Firm* — The Farrell Law Firm, P.C.

(57) ABSTRACT

A method and apparatus are provided. The method includes executing a plurality of threads in a temporal dimension, executing a plurality of threads in a spatial dimension, determining a branch target address for each of the plurality of threads in the temporal dimension and the plurality of threads in the spatial dimension, and comparing each of the branch target addresses to determine a minimum branch target address, wherein the minimum branch target address is a minimum value among branch target addresses of each of the plurality of threads.

18 Claims, 8 Drawing Sheets

(51) Int. Cl.
   *G05B 19/4097*   (2006.01)
   *G06F 30/327*    (2020.01)
   *G06F 119/06*    (2020.01)

(56) References Cited

U.S. PATENT DOCUMENTS

| | | | |
|---|---|---|---|
| 7,761,697 B1* | 7/2010 | Coon | G06F 9/322 |
| | | | 712/233 |
| 8,127,115 B2 | 2/2012 | Doing et al. | |
| 8,200,940 B1* | 6/2012 | Lindholm | G06F 9/5066 |
| | | | 345/418 |
| 8,595,473 B2 | 11/2013 | Hussain | |
| 8,959,500 B2* | 2/2015 | Van De Waerdt | G06F 9/3846 |
| | | | 712/1 |
| 9,367,314 B2 | 6/2016 | Grochowski et al. | |
| 9,390,221 B2 | 7/2016 | Oh et al. | |
| 2002/0194462 A1* | 12/2002 | Henry | G06F 9/3017 |
| | | | 712/238 |
| 2008/0172643 A1 | 7/2008 | Douskey et al. | |
| 2013/0198498 A1* | 8/2013 | Koju | G06F 9/3005 |
| | | | 712/234 |
| 2013/0232322 A1* | 9/2013 | Fetterman | G06F 9/3887 |
| | | | 712/225 |
| 2015/0378733 A1* | 12/2015 | Beylin | G06F 9/3887 |
| | | | 712/226 |
| 2016/0019066 A1* | 1/2016 | Diamos | G06F 9/30087 |
| | | | 712/228 |
| 2016/0378499 A1 | 12/2016 | Burger et al. | |

OTHER PUBLICATIONS

Princeton, New Jersey, pp. 1-6, ISLPED' 01 Aug. 6-7, 2001, Huntington Beach, CA.

Vijayalakshmi Saravanan, et al., "A Study on Factors Influencing Power Consumption in Multithreaded and Multicore CPUs", WSEAS Transactions on Computers.

ISSN: 1109-2750, Issue 3, vol. 10, Mar. 2011, pp. 93-103.

Jingwen Leng, et al., "GPUWattch: Enabling Energy Optimizations in GPGPUs", The University of Texas at Austin, University of British Columbia, University of Wisconsin-Madison.

ISCA '13 Tel-Aviv, Israel, 2013, ACM 978-1-4503 2079—May 13, 2016.

\* cited by examiner

US 10,691,455 B2

POWER SAVING BRANCH MODES IN HARDWARE

PRIORITY

This application claims priority under 35 U.S.C. § 119(e) to U.S. Provisional Patent Application No. 62/509,885 which was filed in the U.S. Patent and Trademark Office on May 23, 2017, the entire content of which is incorporated herein by reference.

FIELD

The present disclosure generally relates to a graphics processing unit (GPU), and more particularly, to a method and apparatus for power saving branch modes in hardware.

BACKGROUND

A GPU may be used to rapidly execute code to accelerate the creation of images in a frame buffer for output to a display device such as a smartphone display. The GPU is highly complex due to the large number of computing threads which are required to be executed in parallel in order to meet the performance demands of the display device. A GPU may be a single instruction multiple thread (SIMT) machine that uses an instruction set architecture in which an instruction is concurrently executed on several threads. A GPU using SIMT is designed to limit instruction fetching overhead, i.e., the latency that results from memory access, in combination with "latency hiding" to enable high-performance execution despite considerable latency in memory-access operations. An SIMT machine may include a processing element that executes instruction streams in a non-stallable fashion.

A GPU may use, for example, eight spatial lanes operating over four time cycles to perform 32 threads of processing. A thread generally refers to a point of control that executes instructions. Processing multiple threads may lead to complexity in managing GPU chip area and dynamic power consumption. The power consumed by any GPU feature is multiplied by the number of threads being executed; hence, a small increase in power consumption for a feature results in a large increase in overall GPU power consumption. Similarly, power consumption reduction for a feature is also multiplied by the number of threads executed resulting in a correspondingly large overall power consumption reduction.

SUMMARY

In accordance with an aspect of the present disclosure, a method is provided which includes executing a plurality of threads in a temporal dimension, executing a plurality of threads in a spatial dimension, determining a branch target address for each of the plurality of threads in the temporal dimension and the plurality of threads in the spatial dimension, and comparing each of the branch target addresses to determine a minimum branch target address, wherein the minimum branch target address is a minimum value among branch target addresses of each of the plurality of threads.

In accordance with an aspect of the present disclosure, an apparatus is provided which includes a memory and a graphics processing unit configured to execute a plurality of threads in a temporal dimension, execute a plurality of threads in a spatial dimension, determine a branch target address for each of the plurality of threads in the temporal dimension and the plurality of threads in the spatial dimension, and compare each of the branch target addresses to determine a minimum branch target address.

In accordance with an aspect of the present disclosure, a method of manufacturing a graphics processing unit, includes forming the graphics processing unit as part of a wafer or package that includes at least one other graphics processing unit, wherein the graphics processing unit is configured to execute a plurality of threads in a temporal dimension, execute a plurality of threads in a spatial dimension, determine a branch target address for each of the plurality of threads in the temporal dimension and the plurality of threads in the spatial dimension, and compare each of the branch target addresses to determine a minimum branch target address, and testing the graphics processing unit, which includes testing the graphics processing unit and at least one other graphics processing unit using one or more electrical to optical converters, one or more optical splitters that split an optical signal into two or more optical signals, and one or more optical to electrical converters.

In accordance with an aspect of the present disclosure, a method of constructing an integrated circuit is provided, which includes generating a mask layout for a set of features for a layer of the integrated circuit, wherein the mask layout includes standard cell library macros for one or more circuit features that include a graphics processing unit configured to execute a plurality of threads in a temporal dimension, execute a plurality of threads in a spatial dimension, determine a branch target address for each of the plurality of threads in the temporal dimension and the plurality of threads in the spatial dimension, and compare each of the branch target addresses to determine a minimum branch target address, disregarding relative positions of the macros for compliance to layout design rules during the generation of the mask layout, checking the relative positions of the macros for compliance to layout design rules after generating the mask layout, upon detection of noncompliance with the layout design rules by any of the macros, modifying the mask layout by modifying each of the noncompliant macros to comply with the layout design rules, generating a mask according to the modified mask layout with the set of features for the layer of the integrated circuit, and manufacturing the integrated circuit layer according to the mask.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
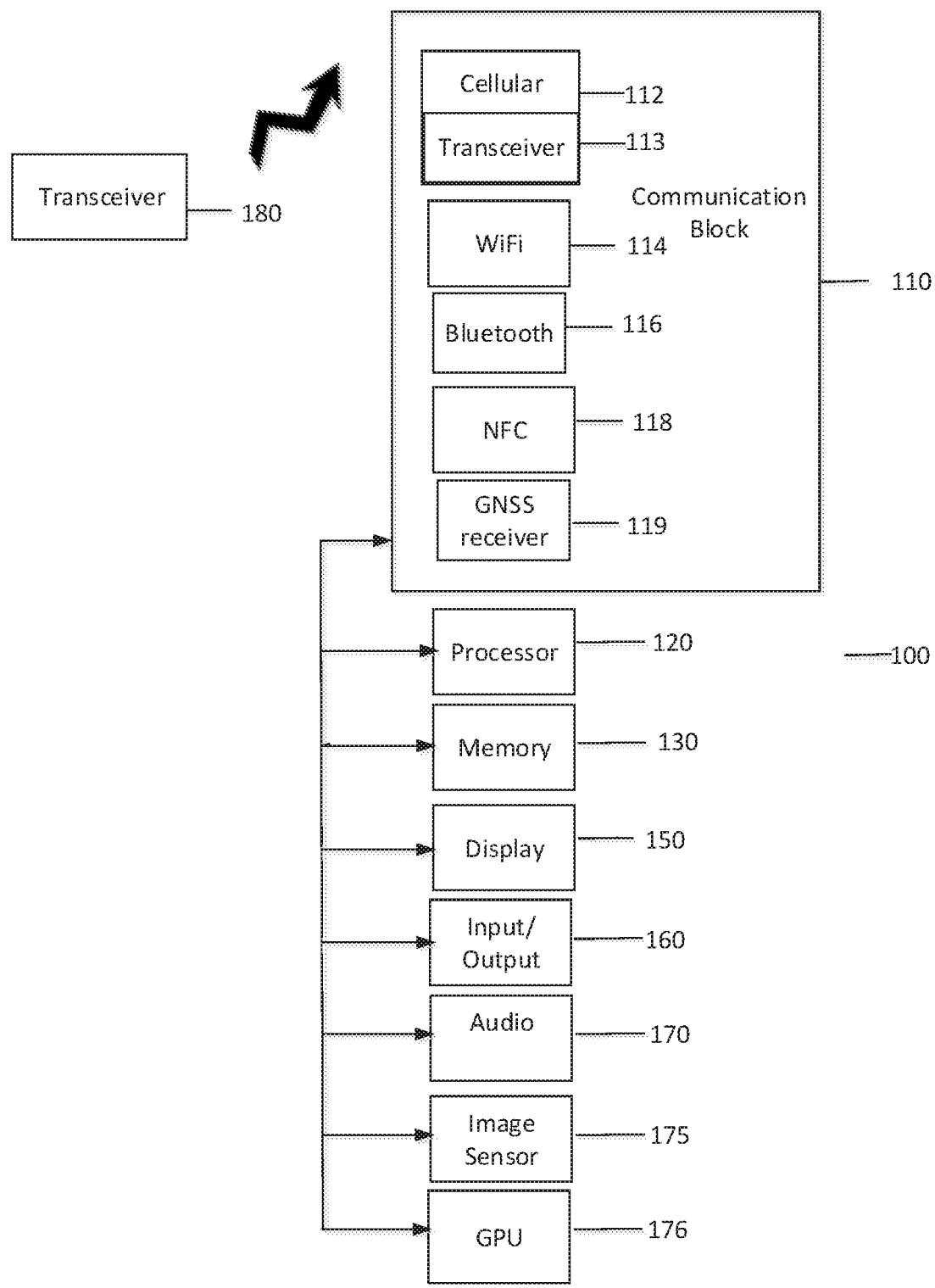
FIG. 1 illustrates an exemplary block diagram of an electronic device in a communication network, according to one embodiment.

FIG. 1 illustrates an exemplary block diagram of an electronic device in a network environment, according to one embodiment.

Referring to FIG. 1, an electronic device 100 includes, but is not limited to, a communication block 110, a processor 120, a memory 130, a display 150, an input/output block 160, an audio block 170, an image sensor 175, a GPU 176 and a wireless transceiver 180. The wireless transceiver 180 may be included in a vehicle, an access point, a mobile electronic device or a cellular base station (such as an eNodeB) and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), LTE, enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT), V2X and short range communications.

The functions of the communication block 110, or a portion thereof including a transceiver 113, may be implemented by a chipset. In particular, the cellular communications block 112 provides a wide area network connection through terrestrial base transceiver stations or directly to vehicle or other electronic devices, using technologies such as second generation (2G), GPRS, EDGE, D2D, M2M, LTE, fifth generation (5G), long term evolution advanced (LTE-A), code division multiple access (CDMA), wideband code division multiple access (WCDMA), universal mobile telecommunications system (UMTS), wireless broadband (WiBro), V2X and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth® communications block 116 provides personal area direct and networked communications using technologies such as IEEE 802.15 and Bluetooth® low energy (BLE) long range (LR). The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100.

The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Bluetooth® block 116.

The memory 130 provides storage for device control program code, user data storage, application code and data storage. The memory 130 may provide data storage for the firmware, libraries, databases, lookup tables, algorithms, and branch target address methods required by the GPU 176. The program code and databases required by the GPU 176 may be loaded into local storage from the memory 130 upon device boot up. GPU 176 may also have local, volatile and non-volatile memory for storing the program code, libraries, databases, calibration data and branch target address code.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100. The GPU 176 may execute code to accelerate the creation of images in a frame buffer for output to the display 150.

The wireless transceiver 180 may be included in an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), vehicles, servers or a combination thereof. The wireless transceiver 180 may be used to transmit the communication signals, such as voice or data.

A GPU may have 8 spatial lanes operating over 4 cycles to perform 32 threads of processing. A thread operating on a GPU generally refers to a point-of-control that may execute instructions. The power consumed by any GPU feature is multiplied by the number of threads being executed; hence, a small increase in power consumption for a feature results in a large increase in overall GPU power consumption. Similarly, power consumption reduction for a feature is also multiplied by the number of threads executed resulting in a correspondingly large overall power consumption reduction.

The die area cost of executing multiple threads in parallel in a GPU may be reduced by sequencing the execution of the threads in spatial dimensions (executing threads in parallel over hardware lanes) and temporal dimensions (executing sequentially in time), or in other words, as a combination of parallel and serial execution. For example, when instructions are executed for 32 threads, hardware may be instantiated on the die for only eight threads (or lanes) which may execute eight threads in parallel (spatial dimensions). Executing the eight threads in parallel may be performed over four consecutive time cycles (temporal dimensions) resulting in a total of 32 thread executions. Hence, the die area is reduced to almost one fourth, with a corresponding performance cost. A GPU may be implemented following design considerations between spatial dimensions and temporal dimensions to optimize the tradeoff between execution performance and die area.

Figure 2:
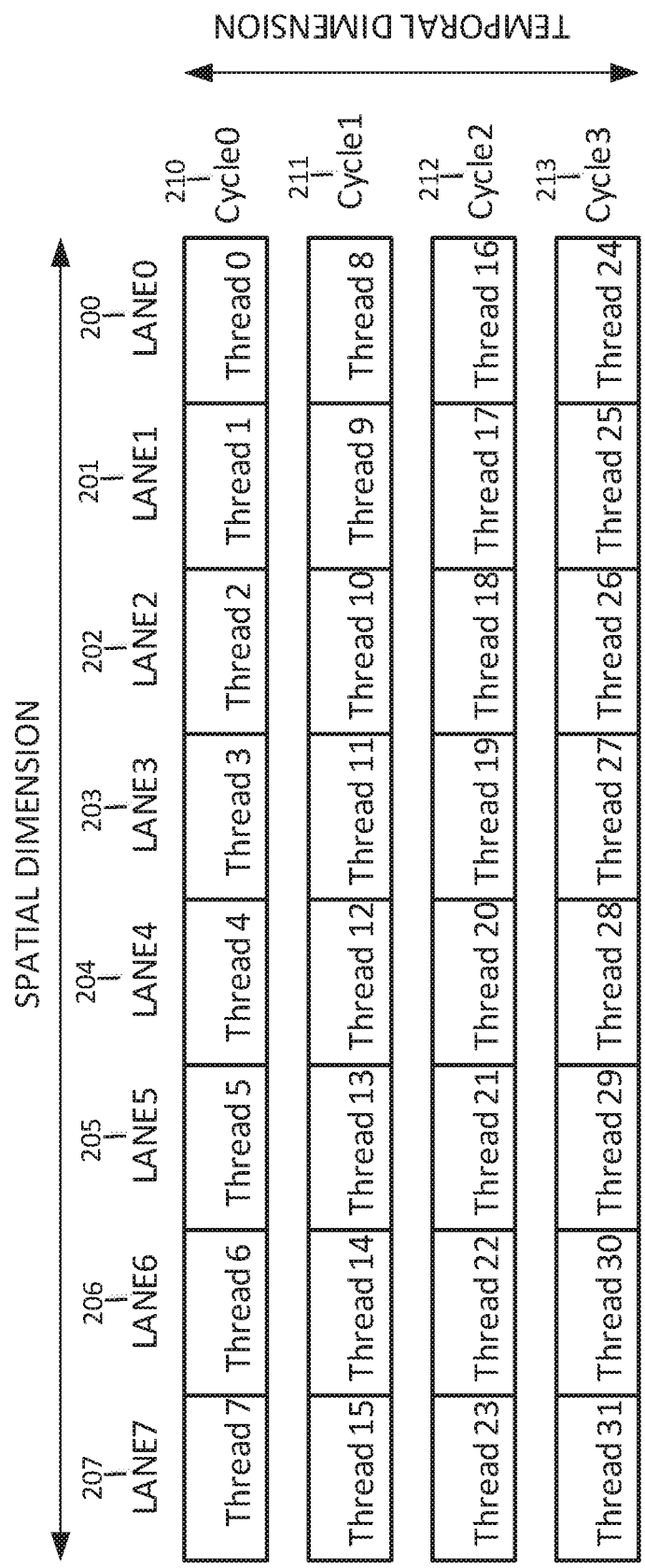
FIG. 2 illustrates an exemplary diagram of 32 threads executed in eight spatial dimensions and four temporal dimensions, according to one embodiment.

FIG. 2 illustrates an exemplary diagram of 32 threads executed in eight spatial dimensions and four temporal dimensions, according to one embodiment.

Referring to FIG. 2, a GPU includes 32 threads executed in eight spatial dimensions (lanes for executing threads) and four temporal dimensions (also referred to as cycles). The 32 threads include thread 0 to thread 31. The 32 threads are divided into eight lanes in the spatial dimension including lane0 200, lane1 201, lane2 202, lane3 203, lane4 204, lane5 205, lane6 206, lane7 207. The 32 threads are also divided into 4 cycles in the temporal dimension including cycle0 210, cycle1 211, cycle2 212 and cycle3 213. According to one embodiment, when instructions are executed using a 32-bit wide datapath in each thread (chosen to match with the standard 32-bit width of floating point calculations), this mode may be referred to as full precision mode. All instructions executed on the GPU may be supported in the full precision 32-bit mode as the datapath of the GPU is instantiated to support a 32-bit width.

According to one embodiment, in order to reduce power consumption in the GPU, lower precision modes such as half precision (16-bit) mode and quarter precision (8-bit) mode are also supported. In the half precision mode, instructions are executed in a 16-bit wide mode and the clock to the other 16 bits of the 32-bit wide datapath are gated which results in reduced power consumption. The other 16-bit datapath may alternately be used to execute another set of threads in 16-bit mode and thereby double the number of threads executed using the same hardware. The method of executing multiple independent threads in parallel with reduced precision by dividing the 32-bit wide datapath may be referred to as braiding.

In the GPU, an instruction processing engine may be referred to as a shader core. A task which is performed by a group of several threads collectively may be referred to as a warp. A trace generally refers to a collection of instructions that execute in a non-stalling continuous sequence. A program executed on a processing element within a GPU may include one or more traces. A program executed on a shader core may be divided into one or more traces to accommodate dependencies of an instruction which is based on an output of another instruction. The division into traces is made such that all the instructions in a trace execute uninterrupted, i.e., without stalling. A program executed on a processing element within a GPU may include one or more traces. Branch target addresses of a program may lay within or beyond a currently executing trace.

Given the SIMT architecture of shader cores, an important instruction for flow control is a branch instruction. An execution of a branch instruction for a single thread may be described as follows. The thread either takes the branch and jumps to a target program counter (PC) or does not take the branch and goes to the next sequential location. The PC is incremented after fetching an instruction, and holds the memory address of ("points to") the next instruction to be executed. The target address for a branch instruction may be within the same trace (referred to as a near branch address) or in another trace (referred to as a far branch address). Since the shader core executes an instruction on several threads in parallel, the decision to take or not take a branch depends on a number of factors including the consideration of each thread, along with its active or inactive status, and maintaining the proper program flow across all executing threads in a warp.

In the spatial dimension, threads are executed in lanes. For example, each of the eight lanes 200 to 207 may perform a full precision (32-bit) execution of a thread. All eight lanes 200 to 207 together may execute eight threads in parallel. Each lane performs execution of four consecutive cycles 210 to 213; hence, performing the execution of a total of 32 threads among all eight lanes 200 to 207.

Instruction processing may be divided into two main processing units: a sequencer that fetches instructions and manages different warps on various processing elements, and a processing element that decodes the instructions, collects all required operands, and uses the operands to execute the instructions. Upon completion of instruction processing, the result may be written to (stored in) the specified destination register in a vector register file.

For branch instructions, the sequencer provides both the sequential PC and the target PC to the processing element. Prior to executing the branch instruction, the processing element computes, for each thread, whether it is going to take the branch (jump) or not take the branch, and instead continue with the next sequential instruction. This operation is referred to as branch target selection.

The branch target address calculation involves selection between the branch target address PC and the sequential PC based on branch target address selection for each of the active threads. In addition, a branch target address is stored per thread that contains the PC where an inactive thread would continue executing from if it were [re-]enabled. The outcomes of each thread's branch target address calculations are then compared against all others to calculate the minimum branch target address. The minimum branch target address is the minimum value among each of the threads' branch target address. The minimum branch target address is used as the next point from which the warp continues its execution. The minimum branch target address is chosen so as to follow the sequential order of execution. When threads in a warp diverge, i.e., branch to different addresses, then execution continues for threads with the minimum address. All the threads whose branch target address calculation result matches the minimum branch target address are marked as active. The balance of the threads are marked as inactive and their branch target address is updated with the PCs they would have gone to next.

Given the divergent nature of branching in program execution and due to multiple threads possibly branching differently, a branch convergence point (BCP) instruction may be used at the end of a branch instruction, to re-activate all the threads that were previously active before the execution of the branch and made inactive while other threads executed code. During the execution of the BCP instruction the branch target address of each thread is compared with the current PC and threads with a branch target address equal to the current PC are re-activated. At the end of the BCP instruction, execution of the program resumes to normal execution as before the branch instruction.

The present system and method includes various precision modes (full, half, and quarter) in branch instruction execution that results in reduced power consumption and performance gains. The execution of a branch instruction includes determining each thread's branch target address, comparing all of the branch target addresses from each thread to determine a minimum branch target address (also referred to as "newPC" herein) that is provided to a sequencer engine to continue the program execution from the newPC for that warp. All threads that have the same branch target address as the newPC are marked as active for the following instruction(s) while the remaining threads are marked as inactive. The minimum branch target address calculation may be performed using the majority of the GPU hardware in full precision 32-bit mode providing the program with a $2^{32}$ address range to jump to, which corresponds to a 4 gigabyte size program memory. The power consumed during the minimum branch target address calculation is based on a 32-bit calculation of each thread and 32-bit comparators used across all threads to compute the minimum branch target address. The method using a 32-bit wide datapath may be referred to as full precision or "highP" mode.

Figure 3:
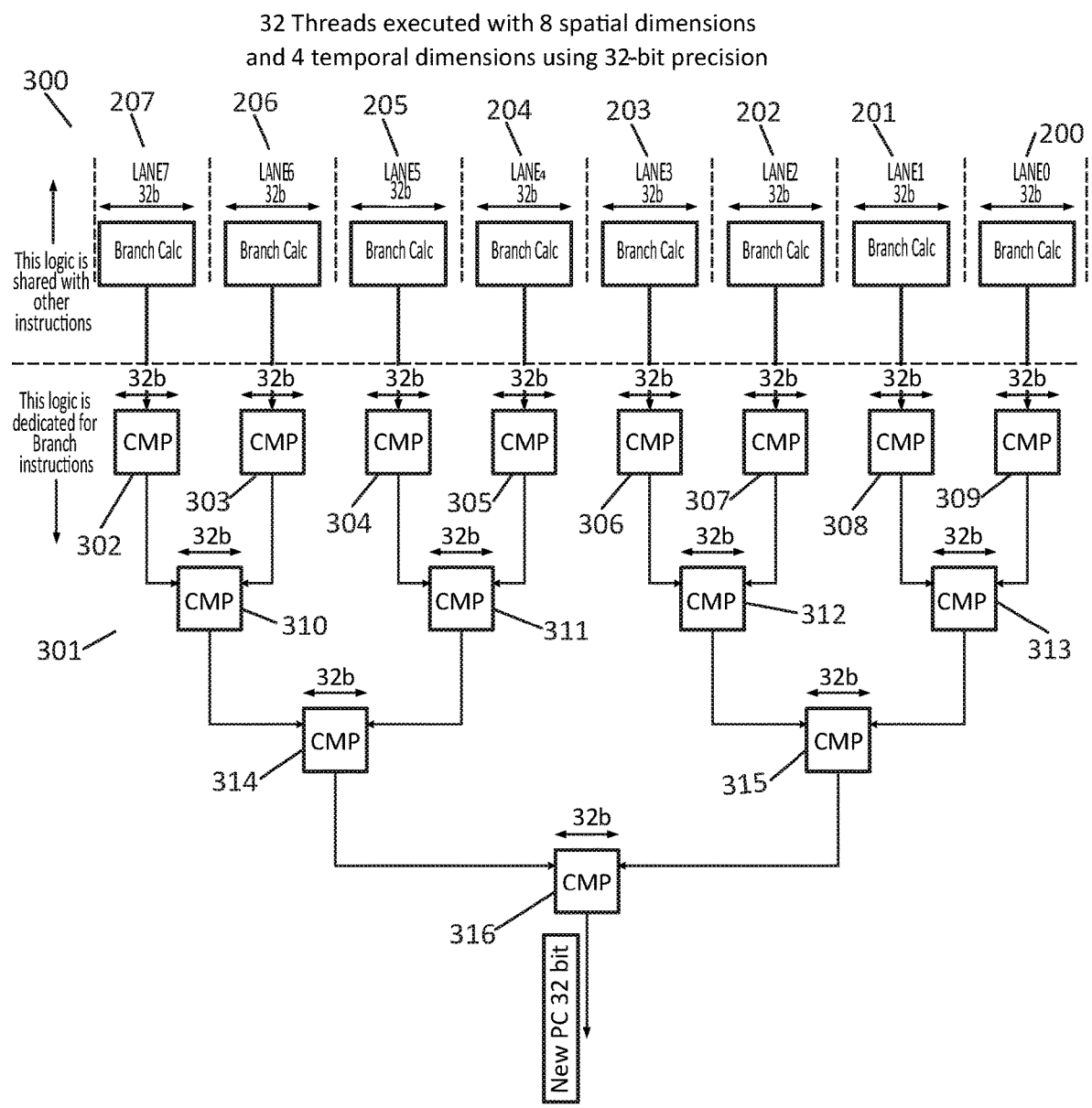
FIG. 3 illustrates an exemplary block diagram of a 32-bit minimum branch target address calculation in full precision mode, according to one embodiment.

FIG. 3 illustrates an exemplary block diagram of a 32-bit minimum branch target address calculation in full precision mode, according to one embodiment.

Referring to FIG. 3, the processing blocks are configured to determine the full precision minimum branch target address and include shared logic blocks 300 and dedicated logic blocks 301. The shared logic blocks 300 may be used to execute branch instructions and other instructions while the dedicated logic blocks 301 may be used only for computing the target PC. The shared logic blocks 300 include lane0 200, lane1 201, lane2 202, lane3 203, lane4 204, lane5 205, lane6 206 and lane7 207. The dedicated logic blocks 301 include address comparators 302 to 316. Each of the comparators 302 to 309, operating in 32-bit mode, compare the branch target addresses for the 4 time cycle threads in their respective lane. Each comparison step determines the minimum address among the inputs and provides the determined minimum address as an output for the next comparison stage. Comparator 309 computes the minimum branch target address from the 4 time cycle threads in lane0 200. Comparator 308 computes the minimum branch target address from the 4 time cycle threads in lane1 201. Comparator 307 computes the minimum branch target address from the 4 time cycle threads in lane2 202. Comparator 306 computes the minimum branch target address from the 4 time cycle threads in lane3 203. Comparator 305 computes the minimum branch target address from the 4 time cycle threads in lane4 204. Comparator 304 computes the minimum branch target address from the 4 time cycle threads in lane5 205. Comparator 303 computes the minimum branch target address from the 4 time cycle threads in lane6 206. Comparator 302 computes the minimum branch target address from the four time cycle threads in lane7 207.

The next step in the minimum branch target address calculation is for comparators 310 to 313 to compare the minimum address results from the four time cycles (previous stage) between each of the eight lanes. Comparator 313 calculates the minimum branch address between the results from comparator 309 and comparator 308. Comparator 312 calculates the minimum branch address between the results from comparator 307 and comparator 306. Comparator 311 calculates the minimum branch address between the results from comparator 305 and comparator 304. Comparator 310 calculates the minimum branch address between the results from comparator 303 and comparator 302.

The next step in the minimum branch target address calculation is for comparators 314 and 315 to compare the minimum address results from comparators 310, 311, 312 and 313. Comparator 315 calculates the minimum branch address between the results from comparator 313 and comparator 312. Comparator 314 calculates the minimum branch address between the results from comparator 311 and comparator 310. In the final step, comparator 316 calculates the 32-bit minimum branch target address (newPC) by comparing the results from comparator 315 and comparator 314.

The dynamic power consumption for branch execution may be reduced by not using the full 32-bit precision of the hardware. If the branch target address calculation is executed using 16-bit precision (half precision), the range of program memory space (for the branch address) is also reduced to $2^{16}$=64 kilobytes, the GPU may gate the clock to half of the shared logic blocks 300 during the branch target address calculation as well as half of the dedicated logic blocks 301 used in the address comparators resulting in a reduction in power consumption. Moreover, implementation of the half precision mode does not require significant logic gates, die area, or complexity to use the same set of hardware to perform both full and half precision modes of execution. The half precision mode may be referred to as "mediumP" mode.

Figure 4:
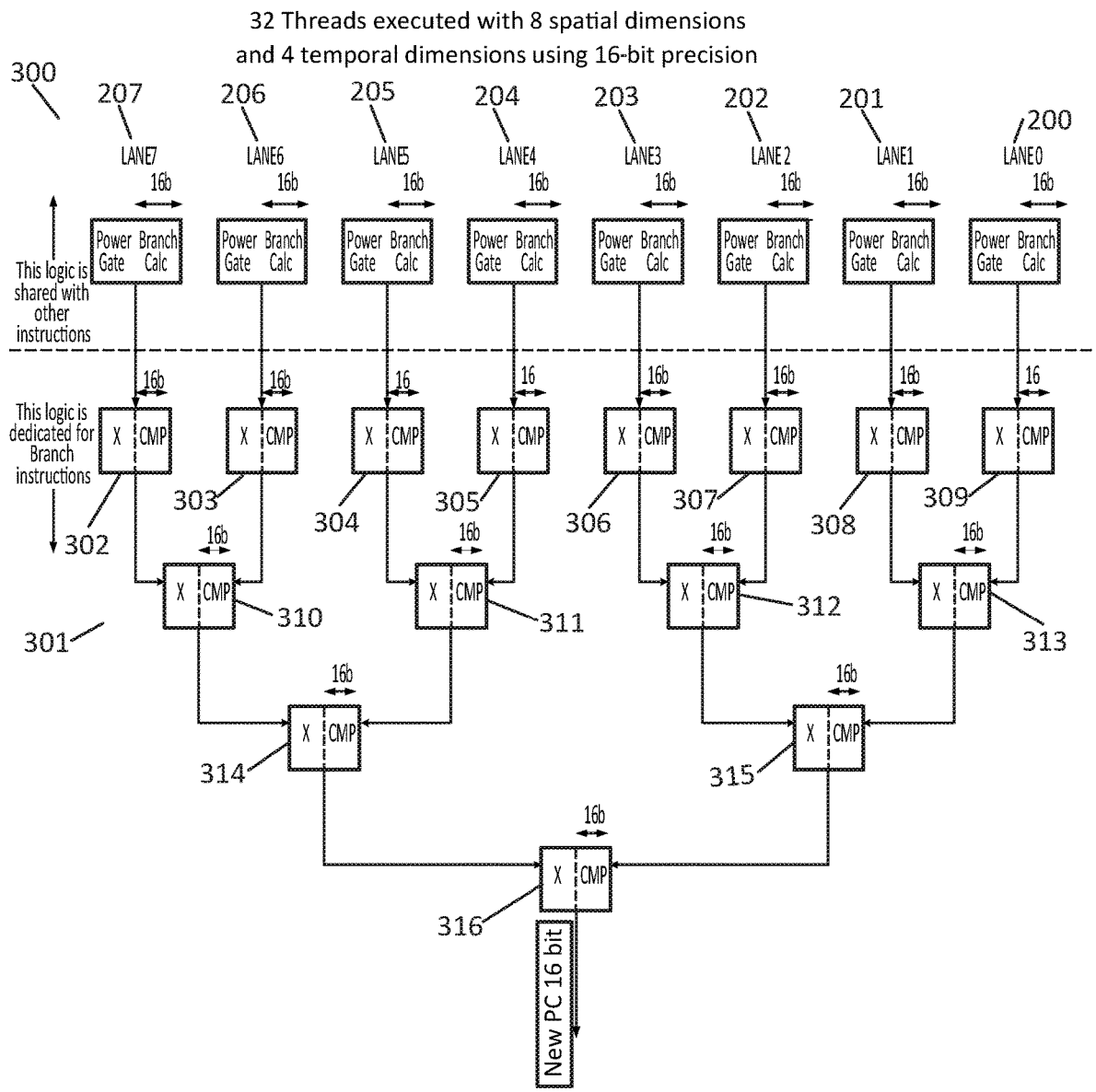
FIG. 4 illustrates an exemplary diagram of a 16-bit minimum branch target address calculation in half precision mode for reducing GPU power consumption, according to one embodiment.

FIG. 4 illustrates an exemplary block diagram of a method of reducing GPU power consumption in a 16-bit minimum branch target address calculation in half precision mode, according to one embodiment.

Referring to FIG. 4, the method of operation with respect to the minimum branch target address calculation in the shared logic blocks 300 and the dedicated logic blocks 301 is identical to the method of operation described above with respect to FIG. 3, except the datapath for each of the lanes 200 to 207 is 16-bit rather than 32-bit and in the address comparators 302 to 316 the branch target address comparison to determine the minimum branch target address (newPC) is also 16-bit rather than 32-bit.

Figure 5:
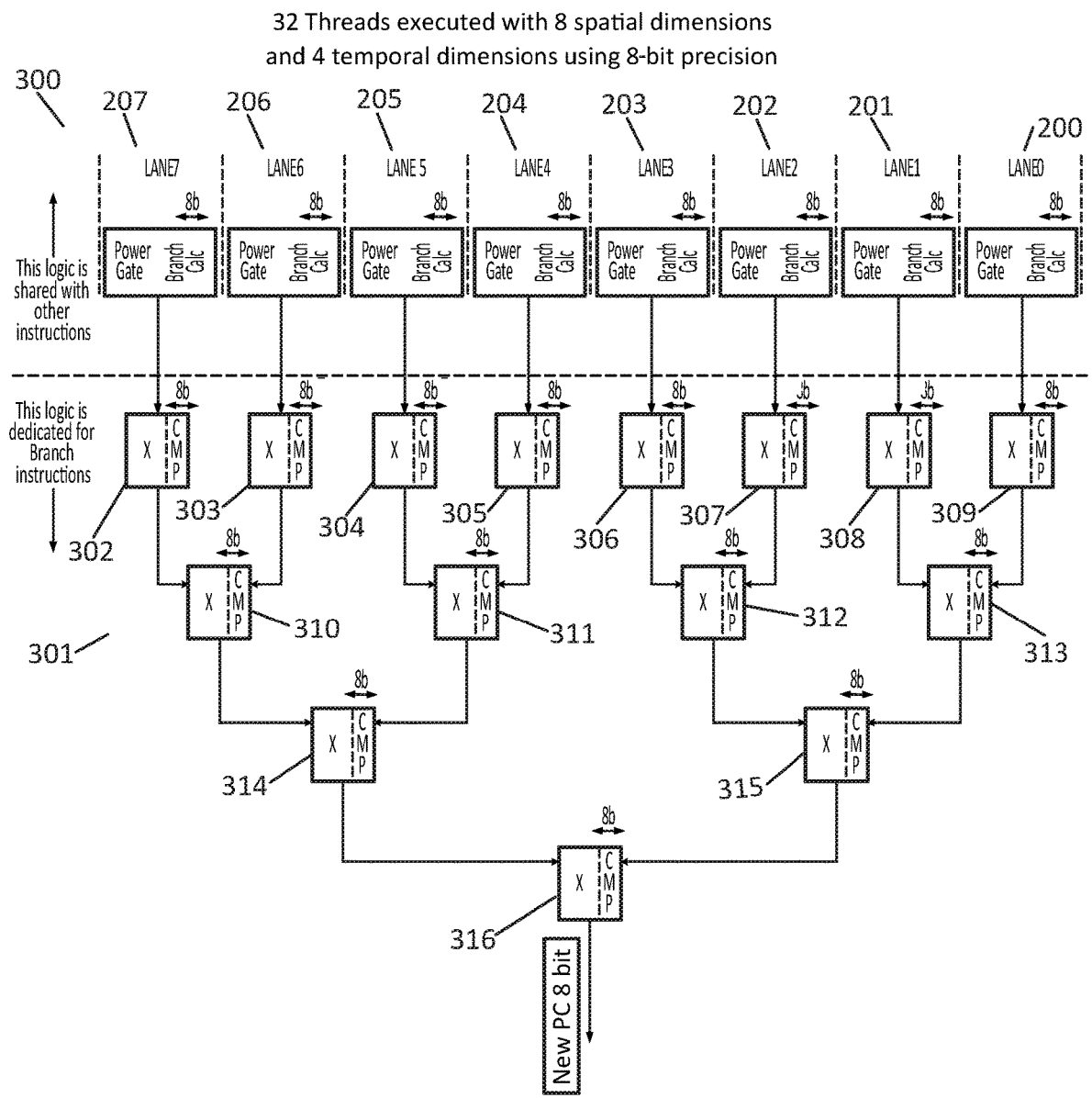
FIG. 5 illustrates an exemplary diagram of an 8-bit minimum branch target address calculation in quarter precision mode for reducing GPU power consumption, according to one embodiment.

FIG. 5 illustrates an exemplary block diagram of a method of reducing GPU power consumption in an 8-bit minimum branch target address calculation in quarter precision mode, according to one embodiment.

The dynamic power consumption for branch execution may be reduced by not using the full 32-bit precision or half 16-bit precision of the hardware. If the minimum branch target address calculation is executed using 8-bit precision (quarter precision), the range of program memory space for the branch address is reduced to $2^{8}$=256 bytes which is sufficient for most of the traces with near branch address jumps. The quarter precision mode may be referred to as a "lowP" mode.

The reduced program address range of 256 bytes in lowP mode is only for the branch address instruction. The rest of the program may be stored and accessed in a larger address space. The remaining, more-significant bits of the branch target address may be appended to the less significant (lower 8 bits) branch target address elsewhere in the sequencer logic.

Referring to FIG. 5, the method of operation with respect to the minimum target branch address calculation in the shared logic blocks 300 and the dedicated logic blocks 301 is identical to the method described above in detail with respect to FIG. 3, except the datapath for each of the lanes 200 to 207 is 8-bit rather than 32-bit and in the address comparators 302 to 316 the address comparison to determine the minimum branch target address (newPC) is also 8-bit, rather than 32-bit.

The 32-bit comparators 302 to 316, which may also operate in 16-bit and 8-bit mode, are dedicated hardware to compute the minimum branch target address. Each of the comparators 302 to 316 includes combinatorial logic for a 32-bit, 16-bit or 8-bit compare operation. The GPU has the flexibility to partition the comparators 302 to 316 into multiple stages by including flip-flop(s) at logical boundary(s) (e.g., moving from rank/level of comparators to the next e.g., from comparators 302-309 to comparators 310-313.). The number of comparator stages may be determined based on GPU clock frequency requirements and the semiconductor process technology used to produce GPU. As an example, the dedicated logic blocks 301 may have 4 levels of comparator logic which may be pipelined into 2 stages by instantiating 2 ranks of flip-flops; each after 2 levels of comparator logic.

Figure 6:
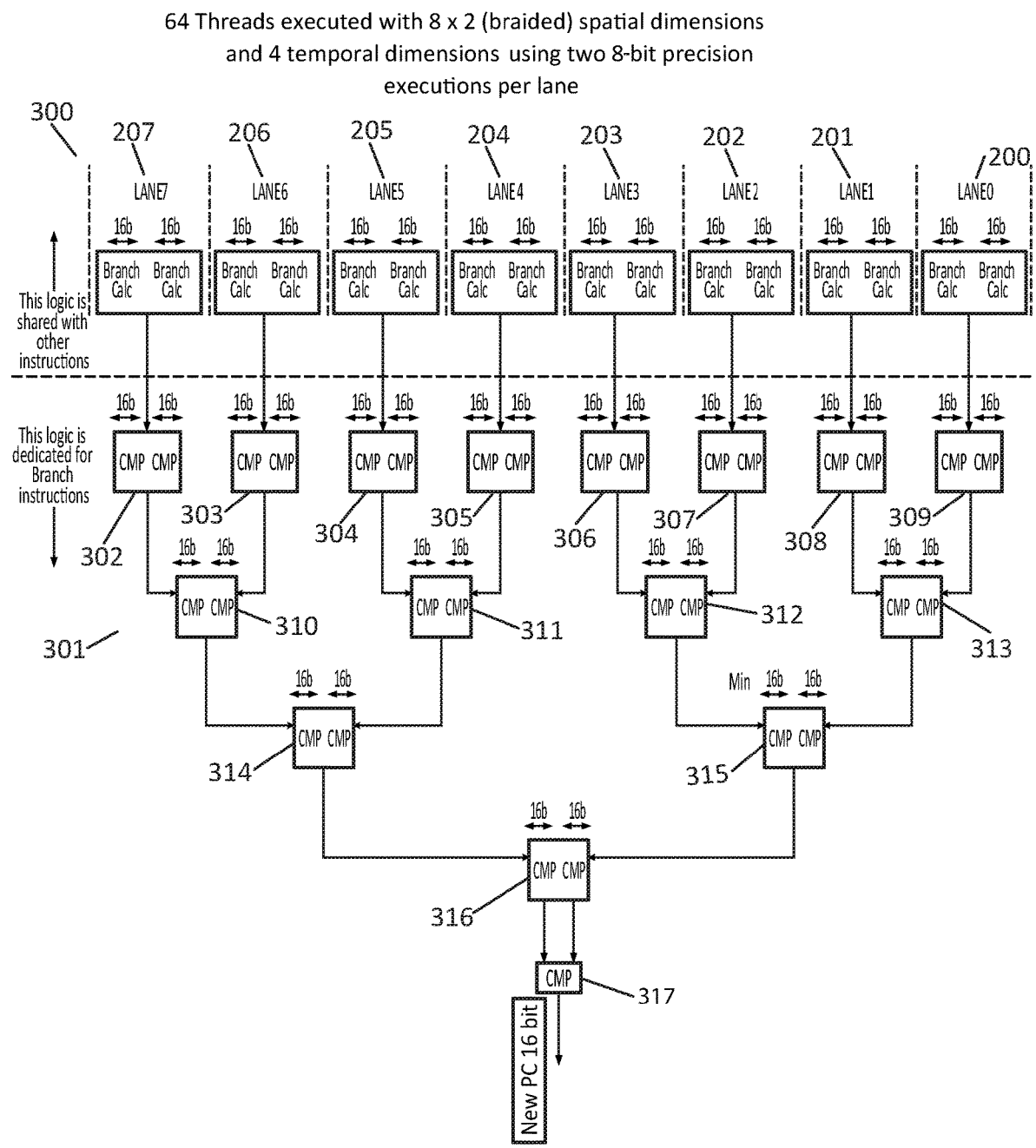
FIG. 6 illustrates an exemplary diagram of a 16-bit minimum branch target address calculation and doubling a number of threads processed in a spatial dimension, according to one embodiment.

FIG. 6 illustrates an exemplary block diagram of a method of reducing GPU power consumption in a medium precision minimum branch target address calculation while doubling the number of threads processed in the spatial dimension, according to one embodiment.

Referring to FIG. 6, 64 threads are executed in a medium precision (16-bit) mode. Each of the eight lanes 200 to 207 performs a braided execution of two 16-bit executions in parallel over four time cycles for a total of 64 threads. The two 16-bit executions are performed by dividing each of the 32-bit data paths in the eight lanes into two logically separate 16-bit datapaths. Each of the comparators 302 to 316 perform two 16-bit comparisons by logically separating the 32-bit datapath to compute the minimum branch target address of 64 threads, resulting in an overall performance gain.

Referring to FIG. 6, the method of operation with respect to the minimum target branch address calculation in the shared logic blocks 300 and the dedicated logic blocks 301 is identical to the method described above in detail with respect to FIG. 3, except the datapath for each of the lanes 200 to 207 and the address comparators 302 to 316 is 16-bit rather than 32-bit and the number of threads is doubled. In FIG. 6, one additional branch target address comparison is calculated in comparator 317 which calculates the minimum target branch address (newPC) between each of the 16-bit branch target addresses from comparator 316.

According to one embodiment, a compiler which generates the program code to execute on GPU provides an indication to use full, half, or quarter precision to calculate the minimum branch target address via the branch instruction. The requirements for the precision level may be determined statically at compile time.

The following examples of commands which determine the precision level for minimum branch target address calculation are based on an implementation of 32-thread hardware in eight spatial and four temporal dimensions:

1. BRANCH.highp.32 Reg: The branch execution is performed in highP mode on all 32 threads. "Reg" is a vector register which contains a vector of target addresses, one per thread.
2. BRANCH.mediump.32 Reg: The branch execution is performed in mediumP mode on 32 threads (hence, shutting off the datapath of the remaining 16 high-order bits using clock gating and thereby reducing power consumption).
3. BRANCH.mediump.64 Reg: The branch execution is performed in mediumP mode on 64 threads (hence executing the minimum target branch address calculation over twice the number of threads in parallel).

The following code section example illustrates how a branch instruction may be executed:

TRACE_0:    //Initial MASK=32'h0000_0007 (bit0→Thread0, bit1→Thread1, ...)

-continued

```
//Thread2, Thread1, Thread0 are active. Thread31-Thread3 are inactive
Label0__0:          //Some instruction sequence
Instr0__0__0;       //
Instr0__0__1;       //
Instr0__0__n;       //
Label0__1:          //Instructions to setup for Branch
INITBTA;            //Initialize the BTA registers for all Threads
                    //to 0xFFFF__FFFF (max PC address - will never be
found as minimum PC)
CMP Rdst, Rsrc0, Rsrc1;    //Compare instruction to evaluate "if" for
which Thread will take the branch
//For example -
//      if (Rsrc0 > Rsrc1)
/           Branch
//      else
//          Sequential
//Rdst will have TargetSelect for each Thread after the CMP instruction is
executed
//Example value of Rdst = 32'h0000__0006
// (meaning Thread1 and Thread2 will Take the Branch)
Label0__2:          //Branch instruction with target to Label0__4
BRANCH @LABEL0__4, Rdst;   //Thread0 is active but TargetSelect
is 0 - hence going to sequential PC
//Thread1 and Thread2 are active and TargetSelect is 1-hence going to
Target PC
//Thread3-Thread31 are inactive hence 0xFFFF__FFFF is taken as Target
PC
//Comparator logic will calculate sequential PC as minimum PC over all
Threads
//new PC is sequential PC.
//New MASK = 32'h0000__0001
//BTA write- Thread3-Thread31=0xFFFF__FFFF,
//          Thread2&3=Target PC(Label0__4),
//          Thread0=sequential PC (Label0__3)
Label0__3:          //Some instruction sequence
Instr0__3__0;       //
Instr0__3__1;       //
Instr0__3__n;       //
Label0__4:          //Branch Convergence Point instruction
BCP;                //Compare Current PC (Label0__4) with BTA for
                    each thread
//Activate Threads with BTA matching with current PC
//Keep the previously activated Thread active
//The compare is performed in the same precision as the
corresponding Branch instruction
//New Mask = 32'h0000__0007
Label0__5:          //Some instruction sequence - Continue normal
                    instruction flow
Instr0__5__0;       //
Instr0__5__1;       //
Instr0__5__n;       //
```

While the present disclosure describes in detail 32 threads of execution per instruction, it is appreciated that the same implementation may execute more or less threads with the same instructions, without deviating from the scope of the present disclosure. For example, 64 threads may be executed using mediumP mode or lowP mode or 128 threads may be executed using lowP mode. The flexibility in executing a variable number of threads is possible with the same shared logic blocks 300 and dedicated logic blocks 301.

According to one embodiment, the present method may use a flexible hardware architecture to execute branch instructions in multiple precision modes to reduce power consumption and improve performance. The present method includes a compiler which compiles programs that provide an indication to the GPU to execute in one of the multiple precision modes. A minimal amount of logic may be required to support an implementation of the multiple precision modes of branch instruction execution including highP (32-bit) mode, mediumP (16-bit) mode, and lowP (8-bit) mode.

According to one embodiment, the present method for executing branch instructions for a multi-threaded GPU includes clock gating one half or three quarters of the shared logic blocks 300 and the dedicated logic blocks 301 during branch target address calculation. The newPC is determined based on the minimum of all branch target addresses. Furthermore, the same method may be used during operation of other non-branch instructions allowing a trade-off between power consumption and branch target address range.

Figure 7:
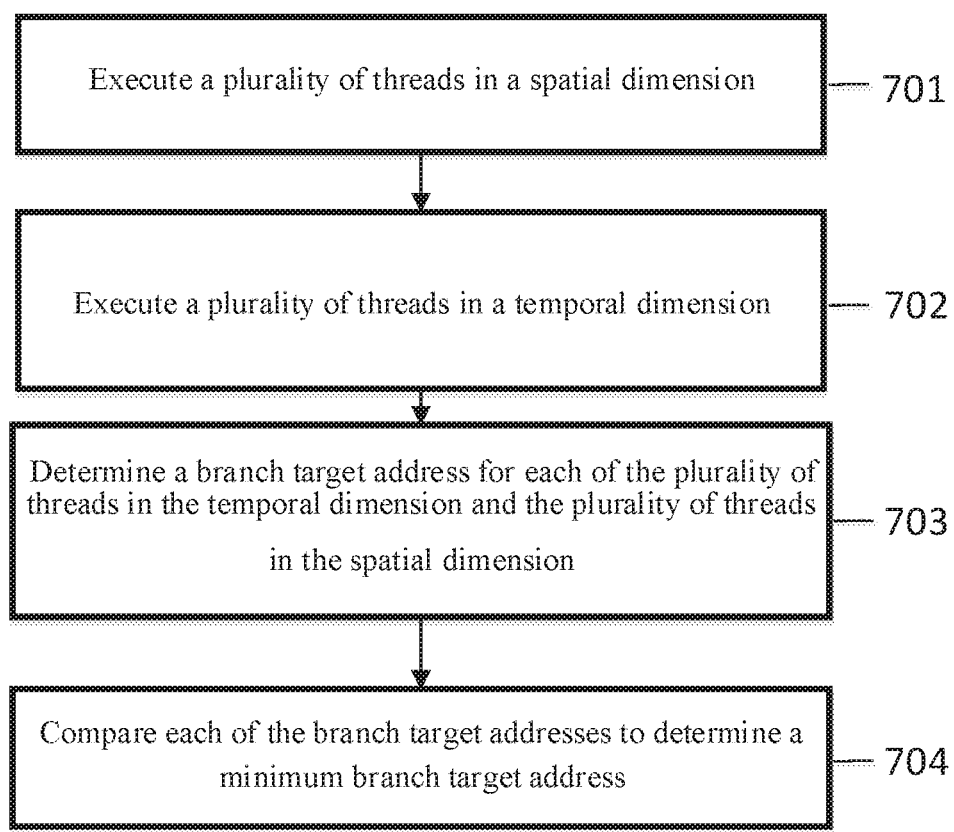
FIG. 7 illustrates an exemplary flowchart of a method of determining a minimum branch target address for a plurality of threads, according to one embodiment.

FIG. 7 illustrates an exemplary flowchart of a method of determining a minimum branch target address, according to one embodiment.

Referring to the flowchart of FIG. 7, the present method, at 701, executes a plurality of threads in a spatial dimension. At 702, the method executes a plurality of threads in a temporal dimension. At 703, the method determines a branch target address for each of the plurality of threads in the temporal dimension and the plurality of threads in the spatial dimension. At 704, the method compares each of the branch target addresses to determine a minimum branch target address.

Figures 8, 9:
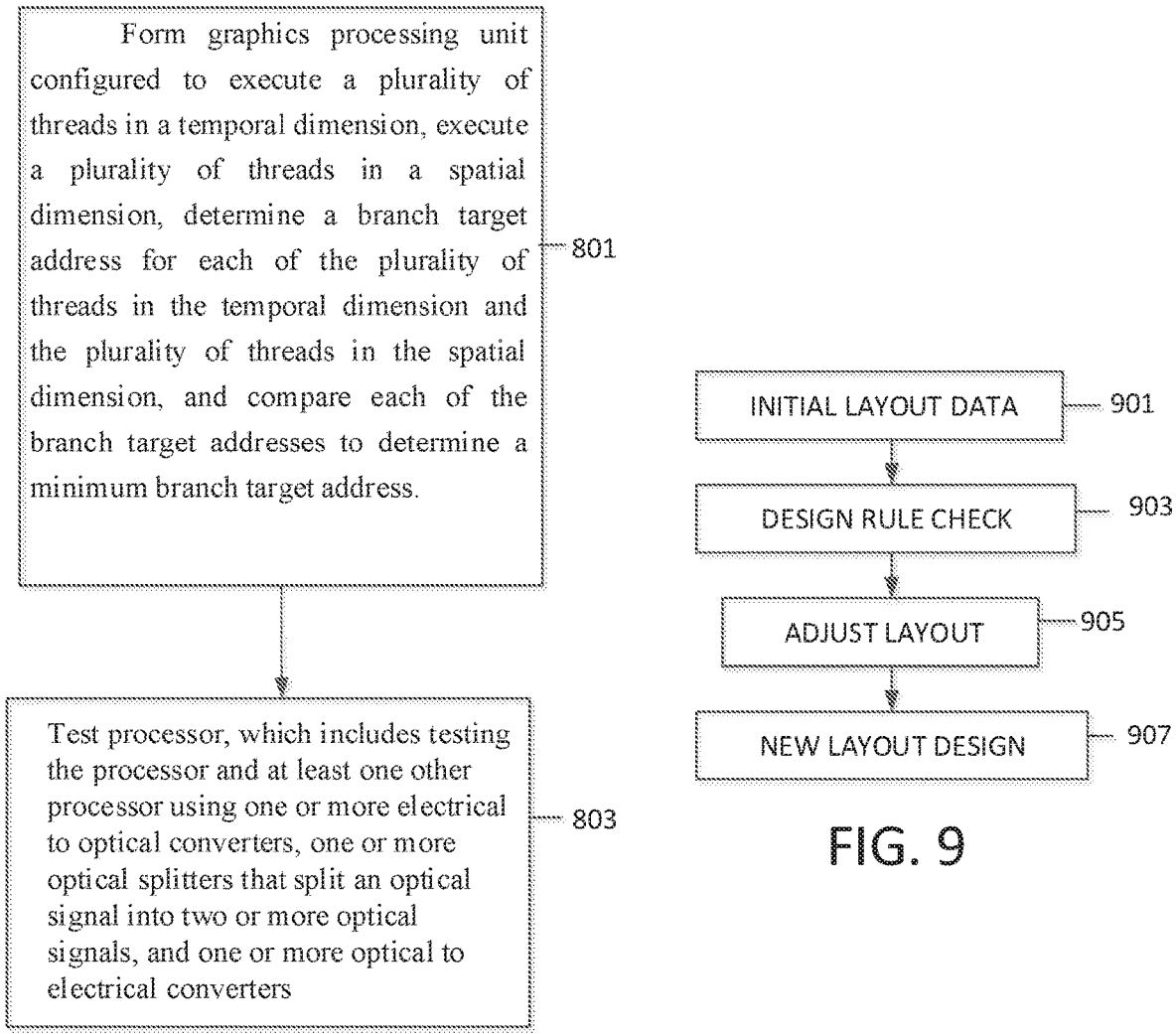
FIG. 8 illustrates an exemplary flowchart of a method of testing a graphics processing unit which determines a minimum branch target address, according to one embodiment.
FIG. 9 illustrates an exemplary flowchart of a method of manufacturing a graphics processing unit which determines a minimum branch target address, according to one embodiment.

FIG. 8 is a flowchart of a method of testing a graphics processing unit, according to one embodiment, where the graphics processing unit is either implemented in hardware or implemented in hardware that is programmed with software.

Referring to FIG. 8, the method, at 801, forms the graphics processing unit as part of a wafer or package that includes at least one other graphics processing unit, wherein the graphics processing unit is configured to execute a plurality of threads in a temporal dimension, execute a plurality of threads in a spatial dimension, determine a branch target address for each of the plurality of threads in the temporal dimension and the plurality of threads in the spatial dimension, and compare each of the branch target addresses to determine a minimum branch target address, and testing the graphics processing unit, which includes testing the graphics processing unit and the at least one other graphics processing unit using one or more electrical to optical converters, one or more optical splitters that split an optical signal into two or more optical signals, and one or more optical to electrical converters.

At 803, the method tests the processor, which includes testing the graphics processing unit and the at least one other graphics processing unit using one or more electrical to optical converters, one or more optical splitters that split an optical signal into two or more optical signals, and one or more optical to electrical converters.

FIG. 9 is a flowchart of a method of manufacturing a graphics processing unit, according to one embodiment. Referring to FIG. 9, the method, at 901, includes an initial layout of data in which the method generates a mask layout for a set of features for a layer of an integrated circuit. The mask layout includes standard cell library macros for one or more circuit features that include a graphics processing unit. The graphics processing unit is configured to execute a plurality of threads in a temporal dimension, execute a plurality of threads in a spatial dimension, determine a branch target address for each of the plurality of threads in the temporal dimension and the plurality of threads in the spatial dimension, and compare each of the branch target addresses to determine a minimum branch target address, and testing the graphics processing unit, which includes testing the graphics processing unit and the at least one other graphics processing unit using one or more electrical to optical converters, one or more optical splitters that split an optical signal into two or more optical signals, and one or more optical to electrical converters.

At 903, there is a design rule check in which the method disregards relative positions of the macros for compliance to layout design rules during the generation of the mask layout.

At 905, there is an adjustment of the layout in which the method checks the relative positions of the macros for compliance to layout design rules after generating the mask layout.

At 907, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
   executing a plurality of threads in a temporal dimension;
   executing a plurality of threads in a spatial dimension;
   determining a branch target address for each of the plurality of threads in the temporal dimension and the plurality of threads in the spatial dimension;
   comparing each of the branch target addresses to determine a minimum branch target address, wherein the minimum branch target address is a minimum value among branch target addresses of each of the plurality of threads; and
   configuring a compiler to determine an n-bit mode for determining the branch target address for each of the plurality of threads in the temporal dimension and the plurality of threads in the spatial dimension, wherein n is an integer power of 2,
   wherein the n-bit mode is one of a quarter-precision, a half-precision, or a full-precision mode.

2. The method of claim 1, wherein a number of threads in the plurality of threads in the temporal dimension comprises at least four and a number of threads in the plurality of threads in the spatial dimension comprises at least eight.

3. The method of claim 1, wherein shared instruction logic and dedicated comparators are used to compare each of the branch target addresses.

4. The method of claim 1, wherein executing the plurality of threads in the temporal dimension and executing the plurality of threads in the spatial dimension is performed in a 32-bit mode.

5. The method of claim 1, wherein executing the plurality of threads in the temporal dimension and executing the plurality of threads in the spatial dimension is performed in a 16-bit mode.

6. The method of claim 1, wherein executing the plurality of threads in the temporal dimension and executing the plurality of threads in the spatial dimension is performed in an 8-bit mode.

7. The method of claim 1, wherein a number of the plurality of threads executed in the spatial dimension is doubled by executing two 8-bit modes in parallel or two 16-bit modes in parallel.

8. The method of claim 3, further comprising gating a clock to disable a portion of the shared instruction logic and the dedicated comparators.

9. The method of claim 1, wherein the n-bit mode is one of an 8-bit, a 16-bit or a 32-bit mode.

10. An apparatus, comprising:
    a memory; and
    a graphics processing unit configured to:
    execute a plurality of threads in a temporal dimension,
    execute a plurality of threads in a spatial dimension,
    determine a branch target address for each of the plurality of threads in the temporal dimension and the plurality of threads in the spatial dimension, and
    compare each of the branch target addresses to determine a minimum branch target address;
    a compiler configured to determine an n-bit mode for determining the branch target address for each of the plurality of threads in the temporal dimension and the plurality of threads in the spatial dimension, wherein n is an integer power of 2,
    wherein the n-bit mode is one of a quarter-precision, a half-precision, or a full-precision mode.

11. The apparatus of claim 10, wherein a number of threads in the plurality of threads in the temporal dimension comprises at least four and a number of threads in the plurality of threads in the spatial dimension comprises at least eight.

12. The apparatus of claim 10, wherein the graphics processing unit includes shared instruction logic and dedicated comparators to compare each of the branch target addresses.

13. The apparatus of claim 10, wherein executing the plurality of threads in the temporal dimension and executing the plurality of threads in the spatial dimension is performed in a 32-bit mode.

14. The apparatus of claim 10, wherein executing the plurality of threads in the temporal dimension and executing the plurality of threads in the spatial dimension is performed in a 16-bit mode.

15. The apparatus of claim 10, wherein executing the plurality of threads in the temporal dimension and executing the plurality of threads in the spatial dimension is performed in an 8-bit mode.

16. The apparatus of claim 10, wherein a number of the plurality of threads executed in the spatial dimension is doubled by executing two 8-bit modes in parallel or two 16-bit modes in parallel.

17. The apparatus of claim 12, wherein a clock is gated to disable a portion of the shared instruction logic and the dedicated comparators.

18. The apparatus of claim 10, wherein the n-bit mode is one of an 8-bit, a 16-bit or a 32-bit mode.

* * * * *